United States Patent [19]
Feild

[11] 3,754,336
[45] Aug. 28, 1973

[54] VEHICLE DRYING APPARATUS

[76] Inventor: Eugene P. Feild, 2213 Mission Blvd., Santa Rosa, Calif. 95405

[22] Filed: Aug. 10, 1971

[21] Appl. No.: 170,597

[52] U.S. Cl............... 34/230, 34/232, 34/233
[51] Int. Cl............................ F26b 19/00
[58] Field of Search............ 34/222, 229, 224, 34/232, 233

[56] References Cited
UNITED STATES PATENTS

| | | | |
|---|---|---|---|
| 2,904,894 | 9/1959 | Hurst | 34/229 |
| 3,409,995 | 11/1968 | Greenwood et al. | 34/229 |
| 3,570,042 | 3/1971 | Solomon | 34/229 |

Primary Examiner—John J. Camby
Assistant Examiner—James C. Yeung
Attorney—Townsend and Townsend

[57] ABSTRACT

A drying apparatus is provided for blowing water, usually as droplets, from a vehicle, by having the vehicle move along a path between two opposed substantially parallel, high velocity air streams which are at a slight angle to the direction of movement of the vehicle. Additionally, an air stream may be directed downwardly from above on the vehicle. The air streams are derived from a single blower, which can be isolated from the operational area and insulated to minimize noise.

The apparatus finds particular use in combination with automobile car washes in being compact, economically constructed, and providing high efficiency in directing the air stream from the blower to the air outlet, so as to maintain the air pressure.

9 Claims, 5 Drawing Figures

Patented Aug. 28, 1973  3,754,336
2 Sheets-Sheet 1
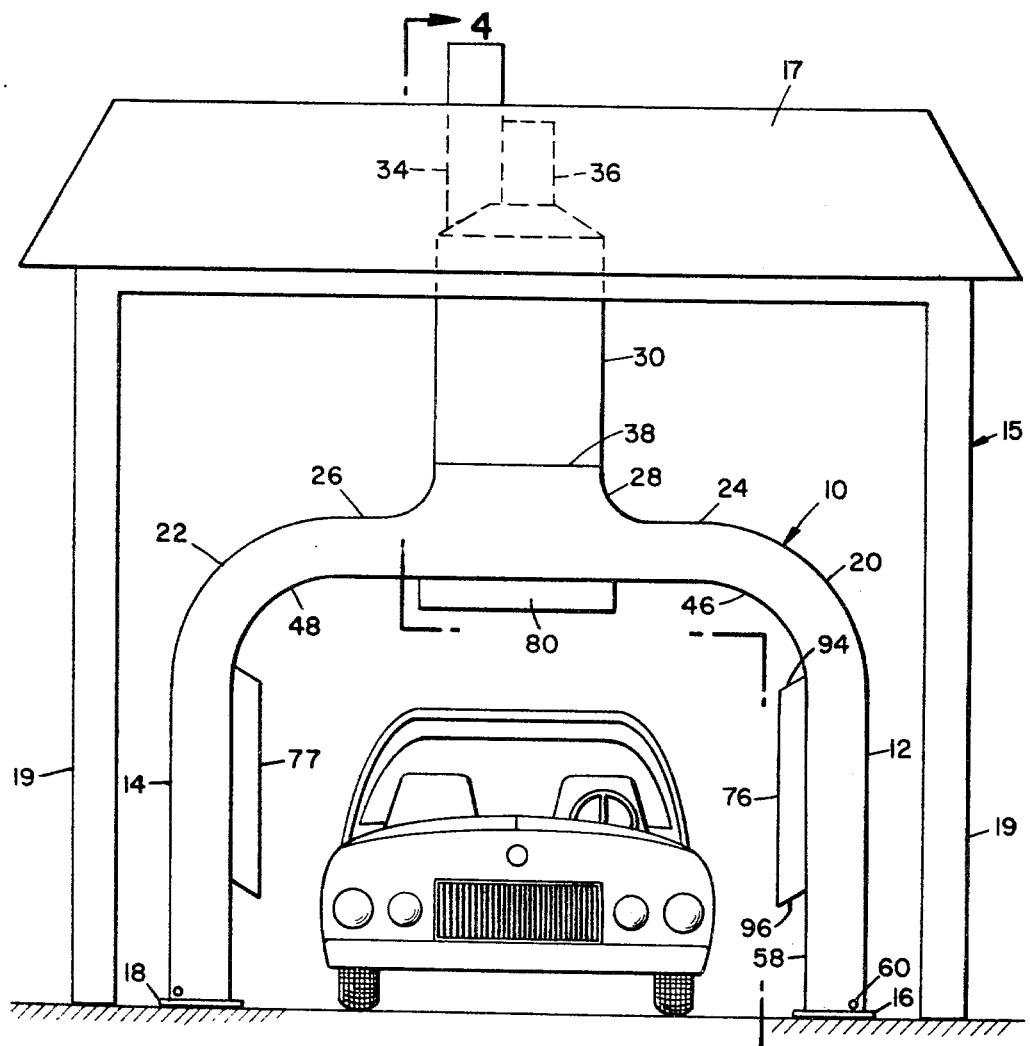
FIG_1
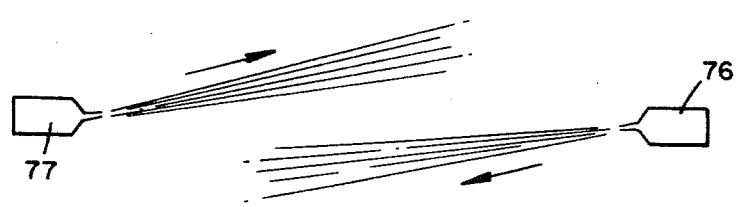
FIG_2

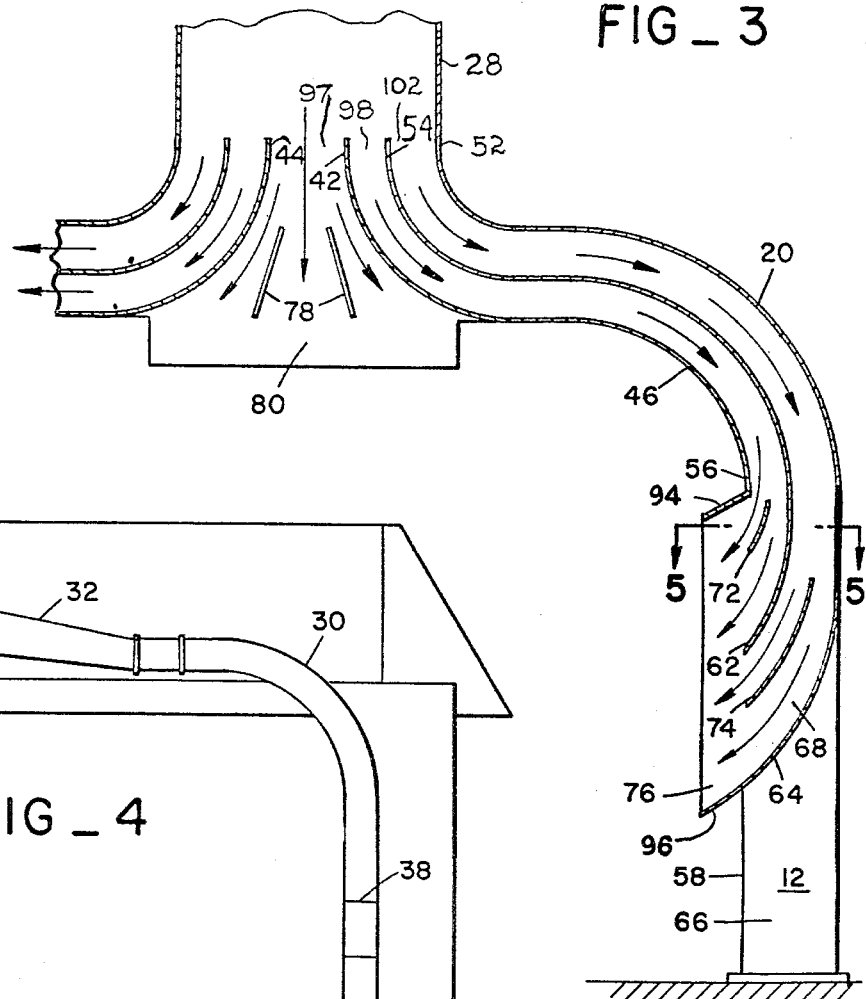
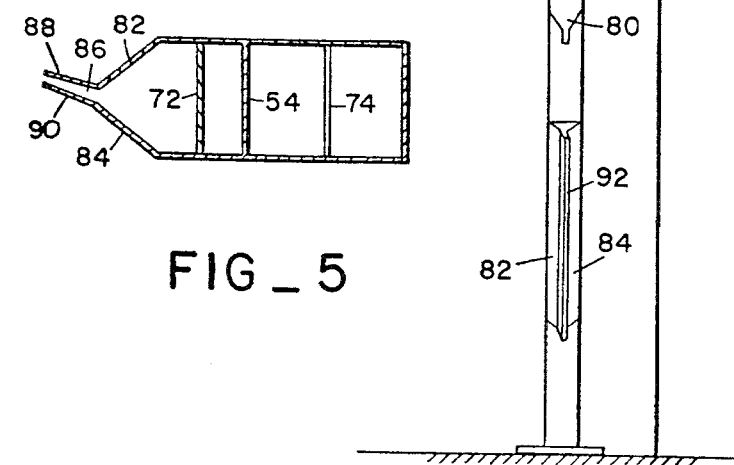

VEHICLE DRYING APPARATUS

BACKGROUND OF THE INVENTION

1. Field of the Invention

The car wash has become a neighborhood occurrence on the American scene. The rapidity and efficiency with which cars can be washed free of grime and accumulated dirt and bugs has expanded the use of car washes to automatically operated devices, which do not even require the presence of attendants. The car as it leaves the car wash area is usually free of dirt, but is generally extensively spotted with large water droplets.

The droplets normally have a significant amount of minerals in the water and, depending on the washing materials, may also contain detergent or other organic agents. Upon drying, the droplets deposit the non-volatile materials leaving ugly spots where the droplets have previously been. Since the spots are unsightly, various means have been employed for removing the droplets before they evaporate and spot the car.

One method is to manually remove the spots by employing sponges, absorbent cloths or chamois. Since this involves the use of manual labor, alternative methods have looked to the use of high velocity streams of air. For the most part, these apparatuses have either blown the air directly from the blower through a slot against the car or have used pressure boxes, where the blower is directed away from the slot, but builds sufficient pressure in the box so as to direct a steady stream of air out of the slot and against the car.

The aforementioned ways of providing an air stream for sweeping droplets create a number of problems. Because the motors are present in the drying apparatus, they cannot be readily insulated for sound. Any insulation will increase the size of the apparatus, which is frequently undesirable and in many instances may make the apparatus unacceptable. In addition, the plurality of motors enhances the probability of breakdown and increases maintenance requirements. Furthermore, the designs which have been employed have not efficiently directed the air flow, both within the enclosure for the motors and after the air stream has exited from the enclosure.

2. Description of the Prior Art

Conventional prior art apparatuses are commercially sold by Earl Wilson, Inc., Long Beach, California and Lark Manufacturing Company, Columbus, Ohio. Patents of interest are U.S. Pat. Nos. 2,770,496, 2,874,485 and 3,584,395.

SUMMARY OF THE INVENTION

A vehicle or other object having water, usually as droplets, spread on its surface is rapidly swept substantially free of water. In this invention, the vehicle moves along a linear path between two oppositely disposed vertically elongate nozzles. Non-intersecting high velocity air streams flow from the two nozzles in relatively parallel streams at a small angle to the path of the vehicle. Normally a third air stream is directed downward onto the top of the vehicle, optionally at a small angle rearwardly from the normal to the path.

A single blower is used, which is situated somewhat distant from the nozzles, so as to reduce the noise in the area of operation. Ducts and baffle walls, having smoothly curved surfaces, direct the air stream from the blower to the nozzle with minimum turbulence to maintain the air pressure in the system.

DESCRIPTION OF THE DRAWINGS

FIG. 1 is a front elevational view partly in section of the vehicle drying apparatus, with an automobile present within the apparatus;

FIG. 2 is a plan schematic view of the ducts and nozzles;

FIG. 3 is primarily one-half of FIG. 1 enlarged and with internal details of the ducts;

FIG. 4 is a side-sectional view along lines 4—4 of FIG. 1; and

FIG. 5 is a plan cross-sectional view of the nozzle and a portion of the duct along lines 5—5 of FIG. 3.

DESCRIPTION OF THE SPECIFIC EMBODIMENTS

While any object having a smooth non-absorbent surface and coated with a sheet or droplets of water may be dried by the subject air drying apparatus, the subject apparatus and method of drying will find primary commercial use with vehicles, particularly automobiles. In accordance with the method of this invention, as an automobile emerges from a car wash, the front of the automobile is met by a high velocity air stream emerging from a first nozzle, at a slight angle rearwardly to the path of the automobile. The air stream contacts the grill or front of the automobile at a point distant from the nozzle. As the vehicle moves forward, the air stream sweeps across the front of the car, first contacting the car at a point nearer and nearer to the nozzle. When the front of the car is adjacent to and begins to pass the first nozzle, the air stream, which has been sweeping the front and hood, begins to sweep the sides and hood.

In addition, a second air stream emerges from a nozzle above the automobile and sweeps down onto the hood blowing the water rearwardly, while the air stream from the first nozzle blows the water across and off of the hood. A third air stream emerges from a nozzle opposite the first nozzle and is directed forwardly and at a slight angle to the path of the automobile. The third air stream sweeps the side of the automobile adjacent the third nozzle and the hood, sweeping the hood after the hood has been swept by the other air streams. Thus, the hood is subjected to repeated sweepings of air streams at high velocity, which do not interfere with each other, but either reinforce or do not intercept.

The two air streams which are oppositely disposed continue to sweep the sides of the car, either forwardly or rearwardly, and are high enough to sweep the roof of the car. Thus, the roof is subjected to the same treatment as the hood, ensuring the substantially complete removal of water from the roof.

As the rear of the car passes the oppositely disposed nozzles—the first and third nozzles—the air stream from the third nozzle will sweep the rear of the car, in substantially the same manner as the first nozzle swept the grill, except beginning at a point adjacent the nozzle and moving across the rear to the opposite side. Therefore, by the above disposition and orientation of the nozzles, the air streams do not intersect so as to create a ridge of water, where the two air streams meet. Also, both the grill and rear of the car are swept free of water, and the top portions of the car—hood and roof—are subjected in effect to three air streams: one from above and one each from either side.

To enhance further understanding of the subject invention, attention is directed to FIGS. 1 and 3. A substantially symmetrical frame 10 has first and second vertical arms 12 and 14. The frame is housed in an enclosure 15 having a roof 17 and side walls 19. The automobile follows a linear path entering the drying apparatus frame from an inlet side and emerging from an outlet side. The inlet side will usually be the exit side of a car wash.

The vertical arms 12 and 14 can be fabricated from sheet metal so as to form a rectangular duct. The bottom ends of the arms 12 and 14 are rigidly bolted to supports 16 and 18 respectively, which may be permanently embedded in the ground. The other ends of the arms 12 and 14 are fitted in a smooth joint to curved duct sections 20 and 22 respectively.

The curved duct sections 20 and 22 connect at junctures 24 and 26 respectively with air stream manifold 28. The air stream manifold 28 is joined to conduit 30, which is joined at its other end to air box 32 mounted on blower 34. The blower is driven by motor 36, which is of the necessary horsepower to provide an air stream of sufficient volume and velocity. The blower 34 and motor 36 are mounted on the roof 17. The blower 34 and motor 36 may be insulated, but must be sufficiently exposed to provide a sufficient source of air. The air stream flows downwardly as it enters the top 38 of the manifold 28, as depicted by the arrows in FIG. 3.

Inside the manifold are curved duct walls 42 and 44 which terminate in contact with the inside walls 46 and 48 of the curved ducts 20 and 22 respectively. Since the two sides of the apparatus are substantially symmetrical, except where differences exist, only the side concerned with the first arm and connecting ducts will be considered. Between the internal wall 42 and the external wall 52 of the manifold 38, is a baffle wall 54 which extends downwardly, continuing and conforming with the shape of the curved duct 20. The inside wall 46 of the curved duct 20 terminates at the junction 56 with the inside wall 58 of the arm 12. The internal baffle 54 continues through the curved duct 20, curving downwardly and inwardly in its final section 62 within the expanded terminal duct section 68.

Inside arm 12 a curved wall section 64 divides the arm 12 into a lower portion 66 of dead air space and terminal duct section 68. At the bottom of the arm 12 is a drain hole 60 to allow any water which accumulates in the dead air space 66 to drain out. Within the terminal duct section 68 are a short upper baffle 72 and a lower baffle 74, which extend the full width of the arm 12. The air stream emerging from the terminal duct section 68 is divided into four streams by the baffles 72 and 74 and the internal baffle wall 54, as the air stream enters the nozzle 76. The same division of the air stream occurs with the oppositely disposed nozzle 77. The nozzles are substantially diametrically disposed.

The downwardly directed air in the manifold 38 is divided into three streams by top baffle walls 78, which extend the width of the manifold and are positioned at a slight angle to the downwardly directed air stream. The inner duct walls 42 and 44 enclose the downwardly directed air stream. The downwardly directed air stream is divided into three channels by the baffle walls 78, as it enters the upper nozzle 80.

The various duct forms or shapes, and the positions of the baffles, are to maximize laminar flow and minimize turbulent flow. Furthermore, the cross sections of the ducts are such that the air stream emerging from the nozzles will be substantially uniform the entire length of the nozzle. The baffles are mounted in the ducts, being fastened to the side walls so as to be permanently positioned.

The nozzle has two oppositely disposed angular sides 82 and 84, which serve to compress the air stream to a relatively narrow inner aperture 86. The nozzle walls 82 and 84 then join louver boards 88 and 90, which are also at a small angle to each other so as to further constrict the air stream.

The louver boards 88 and 90 define an elongated rectangular slot 92 from which the air stream emerges substantially uniformly over the length of the slot. The outer edges of the louver boards 88 and 90 are substantially parallel, defining a uniform slot width. Since the air stream is compressed as it passes through the nozzle, the air stream emerges with greater velocity from the nozzle, than when it entered the nozzle.

At least one of the louver boards defining the nozzle opening will be oblique to the path of the vehicle and usually both louver boards will be at an angle to the path of the vehicle. With the nozzle directing the air stream forwardly, the right hand nozzle in FIG. 2, the louver board nearest the inlet side of the path of the vehicle will be pointed toward the outlet side of the vehicle path. Accordingly, the oppositely disposed nozzle will have the louver board nearest the outlet side of the vehicle path at an oblique angle to the path pointing toward the inlet side of the vehicle path. With the two nozzles diametrically disposed, the air stream paths are directed by the louver boards, so as not to intersect, one air stream directed toward the incoming vehicle and the other air stream away from the incoming vehicle.

The angle of the air streams to the path of the vehicle will be relatively small. Usually, the angle will be less than 20° from the normal to the path, generally in the range of 10° to 15°.

The side nozzle 76 has a cover 94 and a bottom 96 which substantially conform to the shape formed by the walls 82 and 84, and louver boards 88 and 92. The cover 94 and bottom 96 are at a downward angle to the wall 58 of arm 12. The cover 94 is high enough so as to be above the roof of most normal vehicles to permit the flow of air downward and sideward from the nozzle across the roof of an automobile. The cover 94 and bottom 96 are not rigidly affixd to the louver boards 88 and 90, allowing the slot width to be varied. This can be achieved by clamps, bolts through the louver boards, or other convenient means.

As can be seen most clearly in FIG. 3, cover 94, bottom 96, upper baffle 72, lower baffle 74, and the final section 62 of baffle wall 54 all slope downward toward the outlet of nozzle 76. Thus, air egressing from the nozzle moves in a downward direction thereby blowing the water on the vertical surfaces of the automobile downward. The configuration of the air directing parts associated with nozzle 76 thus contributes to improved water removal since the water droplets are blown off the lower edge of the side of the automobile.

To illustrate a specific apparatus, a 25-horsepower motor was employed with a blower capable of providing 7,000 cubic feet of air per minute at a velocity of about 250 m.p.h. At the entrance to the manifold 38, the central channel 96 had a width of 14 inches, while the internal side channel 98 had a width of 5 inches and the external side channel 102 had a width of 6 inches. The width of the internal and external side channels 98 and 102 is maintained till about the juncture 56, between the curved duct 20 and arm 12. The baffles 78 initially divide the internal channel 97 into two side streams of 4-½ inches width and a central stream of 5 inches width, the greatest spacing between the baffles being 12 inches. The upper nozzle 80 is 36 inches long and 5 inches wide at its widest. The upper nozzle is situated about 75 inches above the ground.

The ducts are only about 5 inches wide in the direction of the vehicle path. Therefore, the ducts are relatively narrow, with the internal side duct 98 having a substantially square cross section and the external side duct 102 having a rectangular cross section. The small upper baffle 72 divides the side channel into two equal streams, while the lower baffle 74 divides the outer channel 102, which is expanding in the terminal section 68, initially into an inner 4-½ inch stream and an outer 3-½ inch stream.

The side nozzle 76 is as already indicated substantially the same as the upper nozzle 80 except for the angle of the constricting walls. Therefore, the size nozzles are also 36 inches long, and initially 5 inches wide. The louver boards 88 and 92 can be adjusted to provide a slot width in the range of five-eighths to three-fourths of an inch.

With the above apparatus about 75 percent efficiency is achieved in maintaining the air pressure from the blower. The vehicle is left substantially spot free, with better than 85 percent of the water removed from almost all vehicles.

The air drying apparatus is conveniently combined with a car wash. Because of the narrow dimension in the direction of the path of the car, the apparatus will usually be accomodated by existent car wash buildings or by a small extension of the building. The car conveyor present in most car washes can be extended, if necessary, so as to move the car through the air drying apparatus. By appropriate switches, the blower switch can be activated when the car wash is started and the blower switch actuated, when the front of the car approaches the point at which the car begins to intercept the air stream from the rearwardly directed nozzle. The time during which the car moves past the nozzle will usually be less than about 30 seconds.

Alternatively, the air drying apparatus can be coin operated. The user would merely insert a coin in a switch actuator, if he wanted his car dryed. Other mechanisms for actuating the air dryer could be employed, as would be appropriate to the situation.

The subject invention provides a wide variety of advantages. First, the motor is removed from the operating area normally on a roof, and is therefore partially insulated from the area of operation. The blower may be further insulated compatible with the blower's need for an air supply. Blowers are notoriously noisy and car washes may be precluded from having dryers, when they are situated in close proximity to residences or other businesses. In the subject invention, the motor being on the roof, does not interfere or irritate people in the area of the car wash and can be insulated to diminish the noise further.

The curved nature of the ducts provide a smooth flow and transition from the blower to the nozzles. Furthermore, the plurality of baffles and walls, segregate the flow of air, so that the air emerges in a relatively uniform pattern throughout the nozzle. Unlike a fan tail, where most of the air is in the center, in the subject apparatus, the air is uniformly distributed.

Furthermore, because of the oppositely disposed nozzles which direct air streams oblique to each other, see FIG. 2, the air streams do not create a ridge of water, which would form, if the air streams collided or intersected. Each air stream is independent of the other air stream and does not intersect the path of the other air stream. Thus, each air stream can sweep completely across a top surface.

There is the additional advantage, that the top surfaces are swept twice. The top surface is first swept by the air stream which is directed rearwardly of the path of the vehicle and then swept again by the air stream which is directed forwardly of the path of the vehicle. These angular streams provide the additional advantage of being able to sweep the grill or front of the automobile as well as the rear of the automobile. The two side air streams are capable in themselves of sweeping the entire car. However, it is found advantageous, to provide an additional air stream above, which is directed downwardly and preferably at a small angle rearwardly to the normal to the path of the car.

An additional advantage, is the narrow width of the apparatus employed in this invention. The arms and overhead ducts all have the same width and parallel sides and therefore, define a compact volume. In many conventional car washes, there is only a small amount of additional space which may be employed for introducing an air dryer. The 5 inches is sufficiently narrow to permit the introduction of the air dryer.

In addition, the narrow width of the air dryer does not significantly extend the lot size requirement. It should be recognized, that before a car can be turned, a substantial portion of it must be beyond size barriers. The wider the drying apparatus, the greater the area required in front of the dryer, to provide room for turning the car as it emerges from the dryer.

From a manufacturing standpoint, the apparatus is easily fabricated from sheet metal so as to be easily formed and relatively lightweight. The efficiency of the system permits a relatively low horsepower motor to be employed since the losses in air pressure from the blower to the nozzle are reasonably small. Thus, a high velocity stream emerges from the nozzles, so as to provide efficient removal of water.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. Apparatus for blowing water from the body of a vehicle that is moving along a generally horizontal linear path from the inlet end of the path to the outlet end of the path comprising: first and second air nozzles disposed on opposite sides of said path; each of said first and second air nozzles having first and second air impervious walls terminating in generally vertical parallel edges, said edges being spaced apart to form a thin vertically elongate air outlet opening, one wall of each of said nozzles being air directing, the angle defined by said air directing wall of said first nozzle being opposite and substantially equal to the angle defined by said air directing wall of said second nozzle; and means for supplying high velocity air to said first and second nozzles.

2. Apparatus according to claim 1, including a third air nozzle disposed above said path and being operably connected to said means for supplying high velocity air.

3. An apparatus according to claim 1, wherein said first and second air impervious walls converge toward said air outlet opening, so as to compress air passing through said nozzles.

4. An apparatus according to claim 1, wherein said means for supplying high velocity air comprises blower means operably connected to duct means, and at least one baffle wall, extending transversely of said duct means, so as to divide said duct means into a plurality of channels.

5. An apparatus according to claim 1, including means for adjusting the spacing between said first and second walls of said nozzle operably connected to said nozzle.

6. Apparatus according to claim 1, including means associated with said first and second air nozzles imparting to air egressing therefrom a downward sloping direction of movement so that water droplets on a vertical surface passing said nozzle are blown downwardly of the vertical surface.

7. Apparatus for blowing water from the body of a vehicle that is moving along a generally horizontal linear path from the inlet end of the path to the outlet end of the path comprising:
a blower;
a downwardly directed major duct operably connected to said blower in air receiving relationship; said major duct having at least 3 dividers for dividing said major duct into first, second and third minor ducts;
said first minor duct extending downwardly and terminating in a nozzle having converging sides forming a narrow horizontal aperture;
said second and third minor ducts, diverging sidewardly in opposite directions, curving downwardly and terminating inwardly;
each of said second and third ducts having enclosed upper inner walls forming concave walls of said first duct and having an exposed lower portion;
second and third nozzles in air receiving relationship to respective said second and third ducts and diametrically disposed, each having two converging louver boards terminating in narrow elongated vertical apertures, one of said louver boards of each of said second and third nozzles being air directing and at an angle to said path, the angle defined by said air directing louver board of said second nozzle being opposite and substantially equal to the angle defined by said air directing louver board of said third nozzle.

8. An apparatus according to claim 7, wherein each of said second and third ducts have at least one internal baffle wall dividing each of said second and third ducts into at least two channels.

9. An apparatus according to claim 7, having a substantially uniform dimension in the direction of said path substantially smaller than the dimension normal to said path.

* * * * *